United States Patent [19]
Owenby, Jr.

[11] 3,937,978
[45] Feb. 10, 1976

[54] REMOTE CONTROL SYSTEMS FOR ELECTRICALLY OPERATED LOADS

[76] Inventor: Carl L. Owenby, Jr., 219 W. King St., Quincy, Fla. 32351

[22] Filed: May 30, 1975

[21] Appl. No.: 582,150

[52] U.S. Cl. .................................... 307/41; 307/38
[51] Int. Cl.² ............................................ H02J 3/14
[58] Field of Search ......... 307/38, 40, 41, 116, 117, 307/118, 31, 32, 35, 11; 235/151.21; 219/282, 319, 320, 321, 327, 328, 382, 482, 483, 485, 486, 490, 501; 340/163, 222, 286, 310

[56] References Cited
UNITED STATES PATENTS

| | | | |
|---|---|---|---|
| 3,522,421 | 8/1970 | Miller | 235/151.21 |
| 3,846,641 | 11/1974 | Eguchi | 307/41 |
| 3,862,430 | 1/1975 | Lehhart et al. | 307/35 |

Primary Examiner—Herman Hohauser
Attorney, Agent, or Firm—Bradford E. Kile, Esq.

[57] ABSTRACT

A remote control system for operating electrical loads, particularly in multi-unit lodging establishments such as hotels, motels and the like, includes a power sensing circuit for deenergizing the loads when the power supplied varies beyond predetermined limits in voltage or phase, a restart circuit for sequentially reenergizing the loads with the time between reenergization of loads on successive buses being dependent upon the period of time the loads were deenergized in order not to produce an overload by simultaneous load operation under peak demand conditions, a start-up circuit for controlling the cycle period of the loads in accordance with outdoor temperature in order to provide efficient freeze protection and temperature maintenance, an excess manual switching circuit for comparing the number of loads presently energized with the number of loads energized at a predetermined prior time plus a preset number representing the maximum number of loads desired to be energized over the predetermined period of time such that if the number of presently energized loads exceeds the desired number of energized loads over the predetermined time no additional loads can be manually switched on-line until the number of presently energized loads is reduced below the desired number of energized loads thereby increasing electrical efficiency.

18 Claims, 7 Drawing Figures

REMOTE CONTROL SYSTEMS FOR ELECTRICALLY OPERATED LOADS

BACKGROUND OF THE INVENTION

1. Field of the Invention

The present invention pertains to remote control systems for electrically operated loads and, more particularly, to such systems for controlling electrically operated loads in a multi-unit lodging establishment, such as heating and air-conditioning systems, hot water supply, lighting and the like in hotels and motels and other similarly designed occupancies.

2. Discussion of the Prior Art

Multi-unit lodging establishments, such as hotels, motels, and the like, require equipment for controlling the environment in each unit or room, and inefficient operation of such equipment leads to great economic loss as well as energy waste. To this end, the continuous energizing of such equipment for each unit represents a great waste of energy and increases operating costs; however, individual control of each unit cannot be sacrificed in order to optimize energy usage due to the different comfort requirements of various occupants of the units. Accordingly, there is a need for a remote control system operable from a central station in such establishments, such as in the lobby or at the registration desk, to permit the equipment in the units to be efficiently controlled without inconveniencing occupants of the units.

In operating environmental control equipment, it is important to consider outdoor temperature in order to protect against freezing conditions and to sense conditions of the electrical power supplied for operating the loads to assure that the loads are operated within their recommended design power requirements. An additional problem exists in multi-unit lodging establishments due to the great numbers of electrical loads utilized, and it is desirable to take into account the number of loads on line when controlling the energizing of additional loads. Other considerations include prevention of the temperature of an individual room from dropping below a level at which freeze damage might occur and temperature maintenance of individual units while taking into account the design considerations of the units. There is no system in the prior art capable of providing centralized control for multi-unit lodging establishments in accordance with the above requirements.

SUMMARY OF THE INVENTION

Accordingly, it is a primary object of the present invention to provide a remote control system for electrically operated loads fulfilling the above requirements for multi-unit lodging establishments while overcoming the problems normally associated with such systems.

Another object of the present invention is to utilize a centralized switching system to control remote electrical loads with the statee of the loads annunciated by pilot lights positioned on a console adjacent the switches, the switches and their respective remotely controlled loads being grouped for operation on different buses.

A further object of the present invention is to control remote electrically operated loads in accordance with under-voltage or phase failure of electrical power for operating the loads, current demand of the loads determined by the number of units occupied on a time basis, the length of time during which a load was off-line due to a power outage, and outdoor temperature.

The present invention has another object in that the restarting or re-energizing of loads after a power outage or other power failure is sequentially controlled in accordance with the length of time of the disruption of service.

A further object of the present invention is to compare a timing signal representative of power outage with a preset, time representative signal to provide a compare output for operating sequencer means at a first sequential rate when the timing signal is less than the preset time representative signal and at a second rate slower than the first rate when the timing signal is greater than the preset time representative signal.

The present invention is generally characterized in a remote control system for a plurality of loads adapted to be operated by electrical power supplied on a plurality of buses including a switching circuit for controlling the electrical power supplied the the loads, an electrical sensing circuit for providing a signal corresponding to the variations of the electrical power from a prescribed value, a restart circuit receiving the signal from the electrical sensing circuit and including a timing circuit for producing a timing signal representative of the time the signal from the electrical sensing circuit exists, a plurality of outputs coupled with the switching circuit, and a sequencer responsive to the timing circuit to sequentially operate the output with the time between the operation of the successive outputs dependent upon the time the signal from the electrical sensing circuit exists.

The present invention is further generally characterized in a remote control system for electrically operated loads including a switching circuit for controlling heating equipment, means for sensing outdoor temperature and providing an electrical signal representative thereof, a comparator for comparing the signal from the temperature sensor with predetermined levels to provide a plurality of cycling signals, and means responsive to the cycling signals to cyclically operate the switching circuit whereby the heating equipment is time cycled in accordance with the outdoor temperature.

The present invention is also further generally characterized in a remote control system for electrically operated loads comprising a switching circuit for controlling a plurality of loads, means for manually actuating the switching circuit to energize the switching circuit to energize the loads, a counter for counting the number of loads presently energized and providing a first signal corresponding thereto, a memory having an input receiving the first signal from the counter for storing the first signal and an output providing a second signal stored in the memory for a predetermined period of time and representative of the number of loads energized at a prior time, an adder receiving the second signal from the output of the memory for adding a signal thereto representative of a maximum preset number of loads allowed to be additionally energized in the predetermined period of time to produce a third signal representative of the number of loads representative of the number of loads at the prior time plus the preset number of loads allowed to be additionally energized in the predetermined period of time, a comparator receiving the first signal from the counter and the third signal from the counter for comparing the number of loads presently energized with the number of loads energized at the prior time plus the preset number of loads allowed to be additionally energized in the predetermined period of time, and means responsive to the comparator to prevent energization of a manually actuated load when the number of loads presently energized exceeds the number of loads energized at the prior time plus the preset number of loads allowed to be additionally energized in the predetermined period of time.

Some of the advantages of the present invention over the prior art are that the environment control equipment of a multi-unit lodging establishment can be efficiently operated to limit peak electrical power demand and electrical power consumption, restarting of equipment after a power outage is accomplished without creating excessive demand, automatic cycling is provided in an efficient manner to prevent freeze damage and provide temperature maintenance in response to outdoor temperature, and excessive manually actuated loads are prevented.

Other objects and advantages of the present invention will become apparent from the following description of the preferred embodiments taken in conjunction with the accompanying drawings.

DESCRIPTION OF THE PREFERRED EMBODIMENT

Figure 1:
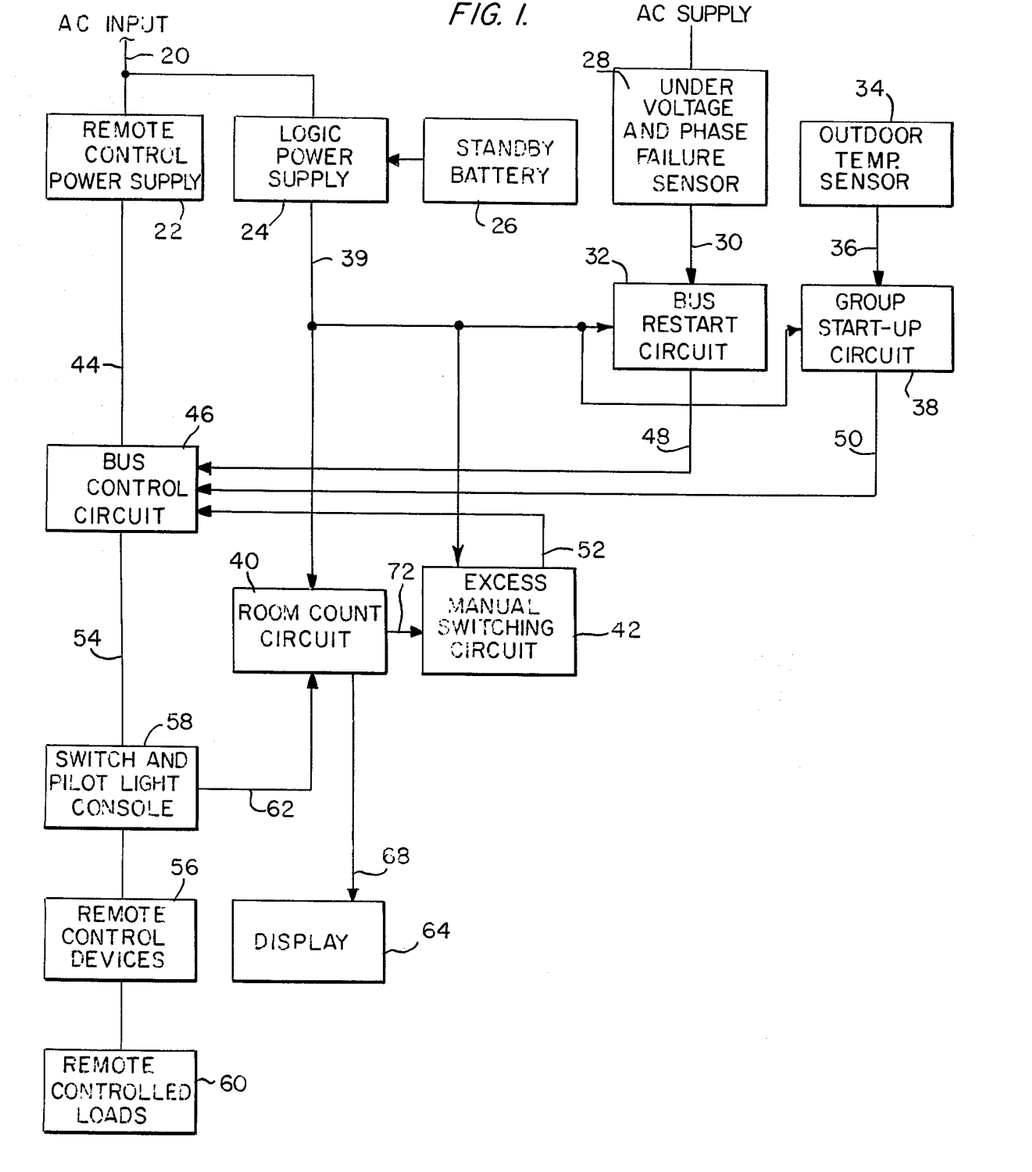
FIG. 1 is a block diagram of a remote control system for electrically operated loads according to the present invention.

A remote control system according to the present invention is shown in block diagram form in FIG. 1 and includes an AC power input 20 from any commercially available source supplying electrical power to a remote control power supply 22 and a logic power supply 24 and a standby battery 26 for supplying electrical power to the logic power supply 24 should the AC power input 20 be interrupted. A circuit 28 monitors the AC supply input in a conventional manner to sense variations in power characteristics, such as under-voltage or phase failure conditions, and has an output 30 supplied to a bus restart circuit 32. A temperature sensor 34 is positioned to sense outdoor temperature and has an output 36 supplying an electrical signal to a group start-up circuit 38. The logic power supply 24 supplies low voltage DC operating power via an output 39 to the bus restart circuit 32, the group start-up circuit 38, a room count circuit 40 and an excess manual switching circuit 42, and power from the remote control power supply 22 on an output 44 is controlled by a bus control circuit 46 which receives outputs 48, 50 and 52 from the bus restart circuit 32, the group start-up circuit 38 and the excess manual switching circuit 42, respectively. The bus control circuit 46 has an output 54 connected with a plurality of remote control devices 56 via a switch and pilot light console 58, and the remote control devices 56 operate a plurality of remote controlled loads 60, such as heating and air-conditioning units, or other similar loads or circuits normally found in a multi-unit lodging establishment, in a conventional manner. The switch and pilot light console 58 has an output 62 connected with the room count circuit 40, and a display 64 is connected with the room count circuit 40 via a lead 68. The room count circuit 40 has an output 72 supplied to the excess manual switching circuit 42.

In order to facilitate understanding of the more detailed circuit description to follow, the general function of the circuits shown in FIG. 1 is set forth at this point. The remote control power supply 22 supplies the electrical power requirements of the remote control devices 56 on output 44 under the control of the bus control circuit 46. The remote control devices 56, which can be any type of suitable switches, including relays or solid state switching devices, operate the remote controlled loads 60 directly or through other switches, such as contactors or relays. The bus control circuit 46 is operated in accordance with the outputs from the bus restart circuit 32, the group start-up circuit 38 and the excess manual switching circuit 42 to control the remote control devices (loads) and therefore the power supplied on the buses. The under-voltage and phase failure sensor 28 detects brown outs, phase loss and power interruption or outage; and, should any of these conditions exist for longer than a predetermined period of time, a signal will be supplied on output 30 to interrupt the power supplied to and, therefore, deenergize the remote control devices 56. The bus restart circuit 32 determines the time during which power was disrupted and controls the restarting of the loads on a sequential basis in accordance with the power disruption time such that for long power disruption periods the intervals between restarting of successive bus loads is increased. The outdoor temperature sensor 34 produces a signal on output 36 representative of outdoor temperature to group start-up circuit 38 for freeze protection and temperature maintenance control, and the group start-up circuit 38 controls the duty cycle or percentage of operating time of the loads in accordance with the outdoor temperature. The room count circuit 40 provides data on output 72 relative to the number of remote control devices 56 presently energized, and the excess manual switching circuit 42 prevents the addition of loads to the power buses when more than a predetermined number of remote control devices have been energized over a predetermined period of time. The display 64 provides a visual representation of the number of remote control devices energized and the pilot lights on console 58 provide an indication of which rooms or units are occupied and which are vacant.

Figure 2:
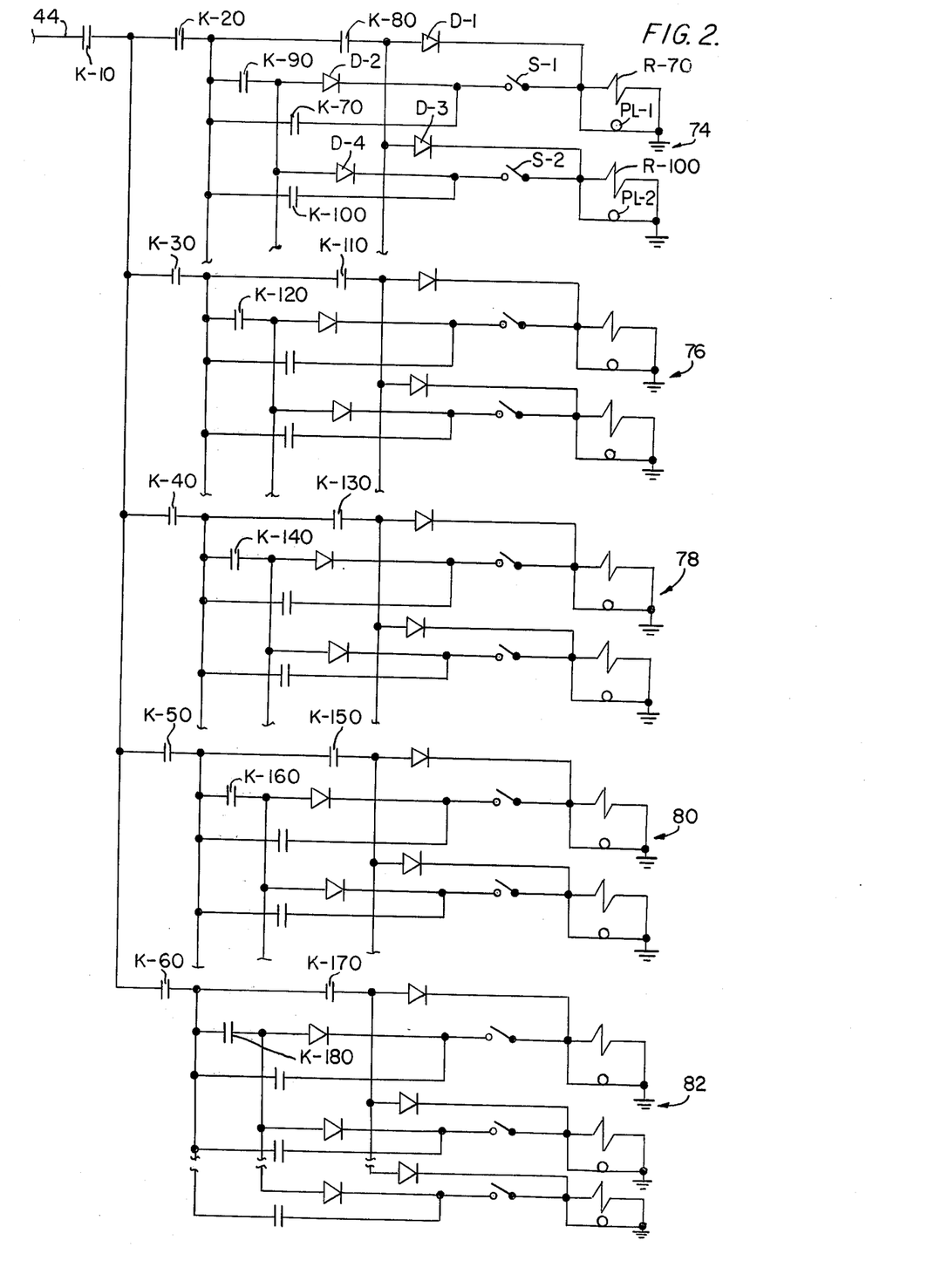
FIG. 2 is a schematic diagram of the bus control circuit, the switch and pilot light console and the remote controlled loads of the remote control system of FIG. 1.

The bus control circuit 46 and switch and pilot light console 58 are shown in FIG. 2 for controlling the remote control devices 56, it being realized that the manually operated switches and the pilot lights forming the concole 58 will be located at a central station, such as the registration desk in the lobby of a multi-unit lodging establishment. Electricity is supplied on output 44 from the remote control power supply 22 through normally open contacts K-10, operated by a conventional relay, not shown, in the under-voltage and phase failure sensor 28, which in turn connects to normally open, bus restart contacts K-20, K-30, K-40, K-50 and K-60, each of which is associated with a group of loads on a bus. It will be appreciated that the contact designations K-n is associated with an operator by corresponding relays R-n to be described hereinafter. The group of loads 74 associated with contact K-20 includes a load relay R-70 connected between groun and contacts K-20 through the series combination of normally open, group start-up contacts K-80 and a diode D-1 in parallel with normally open, escess manual contacts K-90, diode D-2 and manually operated switch S-1. A pilot light PL-1 is connected in parallel across the relay R-70, and normally open holding contacts K-70 are connected in parallel with contacts K-90 and diode D-2. A second load in the form of a relay R-100 is serviced by contacts K-20 and connected thereto in the same manner as relay R-70, that is via a diode D-3 connected with contacts K-80 and a diode D-4 connected between a manually operable switch S-2 and contacts K-90 while holding contacts K-100 are connected in parallel with contacts K-90 and diode D-4. A pilot light PL-2 is connected across load R-100. The remaining loads are connected in groups generally indicated at 76, 78, 80 and 82 serviced via bus restart contacts K-30, K-40, K-50 and K-60, respectively. The circuit connections in each of the bus groups are similar to the connections of group 74 and for purposes of brevity, will not be described in detail, it being noted that group 76 includes start-up contacts K-110 and excess manual switching contacts K-120, group 78 includes start-up contacts K-130 and excess manual switching contacts K-140, group 80 includes start-up contacts K-150 and excess manual switching contacts K-160 and group 82 includes start-up contacts K-170 and excess manual switching contacts K-180. Any number of groups of loads can be utilized with the remote control system of the present invention dependent upon the number of power buses available, and each group can include any suitable number of loads.

In order to energize a selected load, an operator at the central station actuates the corresponding manual switch, for example switch S-1, which will energize relay load R-70 through contacts K-10, K-20 and K-90. Contacts K-10 and K-20 are closed as long as the power supplied to the buses is within the prescribed voltage and phase limits, and contacts K-90 are closed as long as the present number of energized loads is less than the predetermined excess number of loads over a preset period of time. Once relay load R-70 is energized, holding contacts K-70 are closed such that even if an excess number of loads are energized to cause contacts K-90 to open, the relay load R-70 will remain energized. If there is a power outage or other power failure for a time sufficient to energize the relay in the under-voltage and phase failure sensor 28, the contacts K-10 and K-20 will open, along with contacts K-30, K-40, K-50 and K-60, such that the relay load R-70 will be deenergized. After power is returned, contacts K-10 will be immediately closed, and the bus restart contacts will be closed in sequence to reenergize the bus loads sequentially. When contacts K-20 are closed, the relay load R-70 will again be energized as long as manual switch S-1 remains closed. If the outdoor temperature as sensed by sensor 34 creates a demand, group start-up contacts K-80, K-110, K-130, K-150 and K-170 will be automatically cyclically closed in a predetermined sequence to energize the loads with a duty cycle dependent upon the outdoor temperature.

Figure 3:
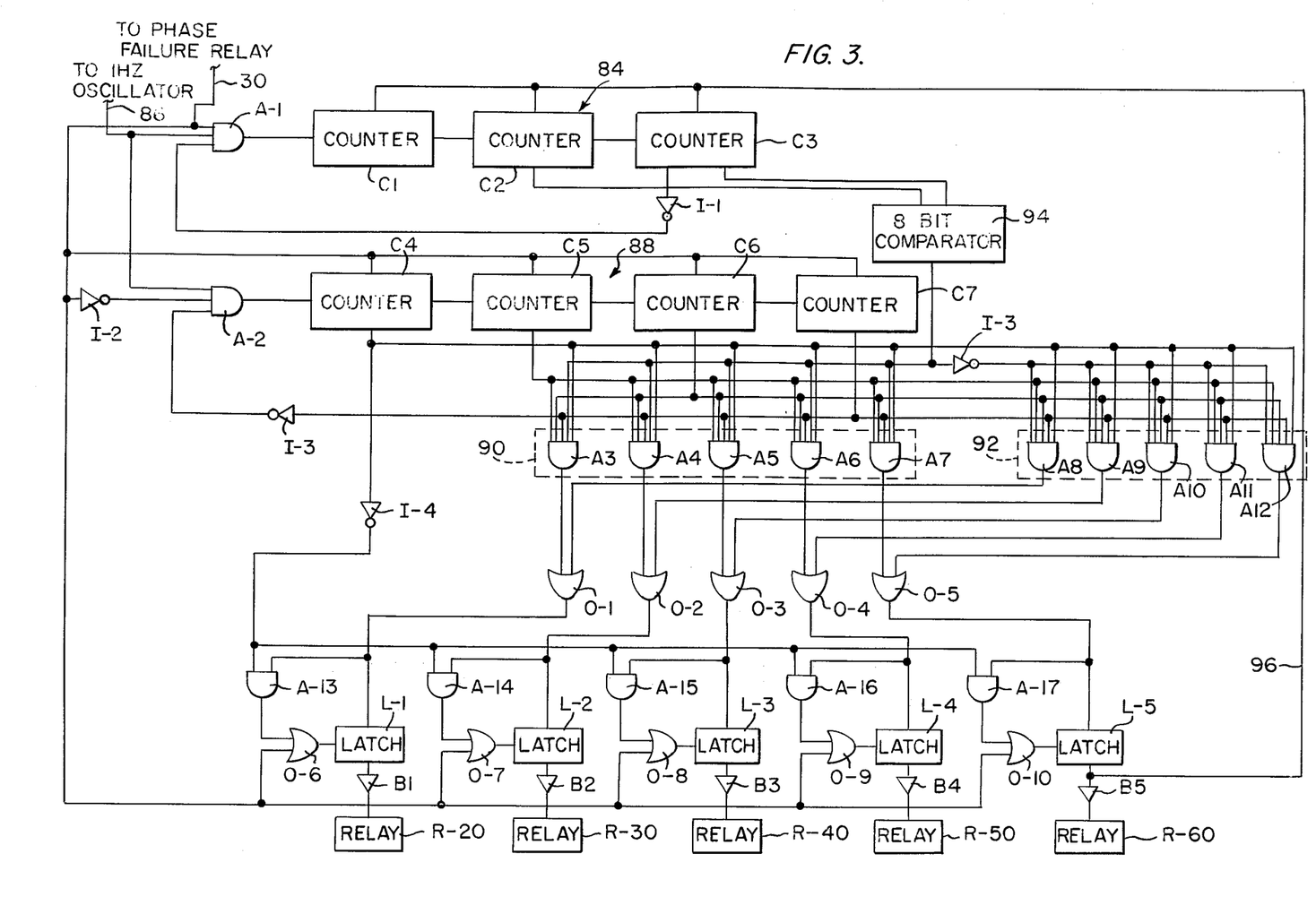
FIG. 3 is a schematic diagram of the bus restart circuit of the remote control system of the present invention.
Figure 5:
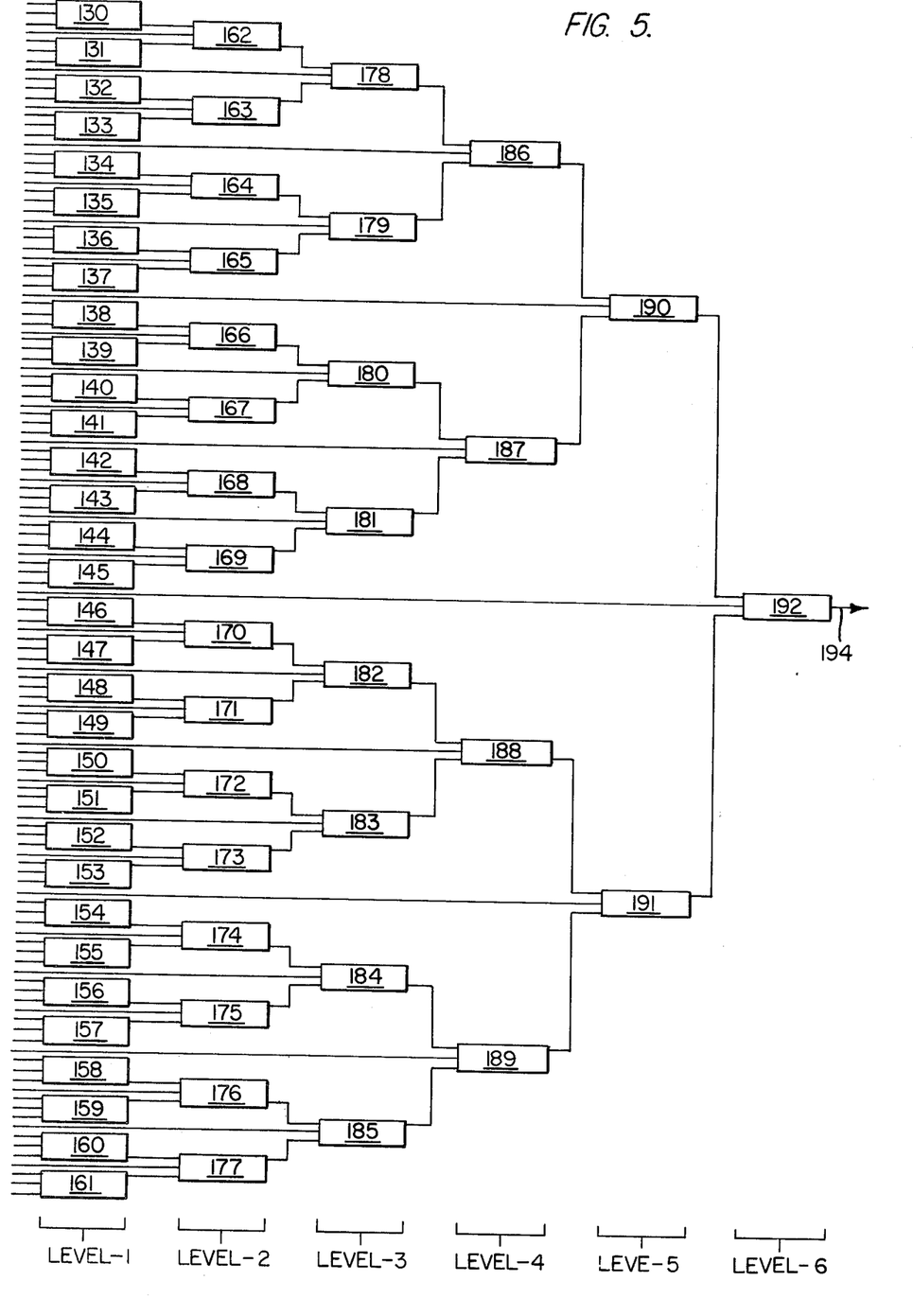
FIG. 5 is a schematic diagram of the room count circuit of the remote control system of the present invention.
Figures 5A, 6:
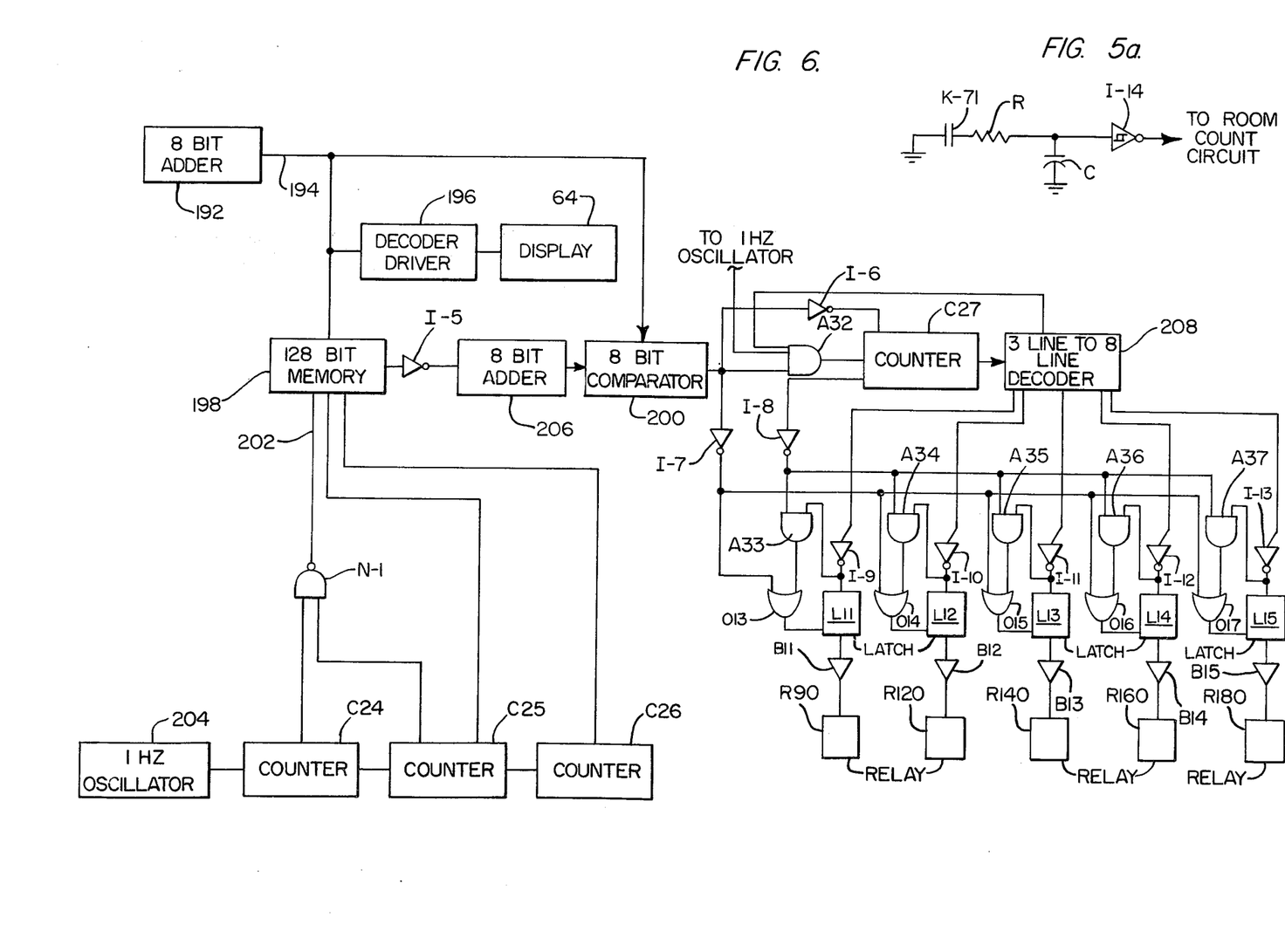
FIG. 5a is a schematic diagram of an input circuit for the room count circuit of FIG. 5.
FIG. 6 is a schematic diagram of the excess manual switching circuit of the remote control system of the present invention.

The bus restart circuit 32 is shown in FIG. 3 and receives the output 30 from under-voltage and phase failure sensor 28 at an AND gate A-1 which supplies pulsed output to a counter chain formed of counters C-1, C-2, and C-3 to define an outage timer 84 with the most significant digit output from the counter chain being supplied through an inverter I-1 to an input of AND gate A-1 which receives a third clock pulse input on a line 86 from a 1Hz oscillator shown in the excess manual switching circuit, of FIG. 6, it being appreciated that a single 1Hz oscillator, such as that in the excess manual switching circuit, can be used to supply 1Hz pulses to the various circuits of the system. A counter chain formed of counters C-4, C-5, C-6 and C-7 defines a restart timer 88 and receives an input from an AND gate A-2. The AND gate A-2 receives the 1Hz oscillator clock signal on lead 86 as one input, the signal on output 30 from the under-voltage and phase failure sensor 28 through an inverter I-2 as a second input and a third input from the most significant digit of the restart timer 88 through an inverter I-3. The outputs of the counters of restart timer 88 are supplied to a sequencer series of AND gates 90 and a sequencer series of AND gates 92, and an eight-bit comparator 94 receives the output from the counters of outage timer 84 to supply a 1 when the output of the outage timer 84 is greater than a predetermined time and a 0 when the output is less than the predetermined time. The output of comparator 94 is connected directly as an input to each of AND gates A-3, A-4, A-5, A-6 and A-7 of sequencer 90 and through an inverter I-3 to each of AND gates A-8, A-9, A-10, A-11 and A-12 of sequencer 92 such that, dependent upon the outage time, either the AND gates of sequencer 90 or sequencer 92 will be enabled. OR gates O-1, O-2, O-3, O-4 and O-5 receive the outputs of AND gates A-3 and A-8, A-4 and A-9, A-5 and A-10, A-6 and A-11 and A-7 and A-12, respectively; and, the outputs of the OR gates are respectively connected as data inputs to latches L-1, L-2, L-3, L-4 and L-5. The signal from output 30 of the under-voltage and phase failure sensor 28 is supplied to the enable inputs of latches L-1, L-2, L-3, L-4 and L-5, respectively, through OR gates O-6, O-7, O-8, O-9 and O-10 which receive second inputs from AND gates A-13, A-14, A-15, A-16 and A-17, respectively. The AND gates A-13, A-14, A-15, A-16 and A-17 each receive an input from the least significant digit of restart timer 88 through an inverter I-4 and an input from OR gates O-1, O-2, O-3, O-4 and O-5, respectively. The outputs from latches L-1, L-2, L-3, L-4 and L-5 are connected through buffers B-1, B-2, B-3, B-4 and B-5 to bus restart relays R-20, R-30, R-40, R-50 and R-60, respectively, which control corresponding bus restart contacts K-20, K-30, K-40, K-50 and K-60 in the bus control circuit of FIG. 2. The outage timer 84 is reset to zero via a lead 96 from latch L-5, and the restart timer 88 is reset to zero by a 1 received on output 30 from under-voltage and phase failure sensor 28.

The operation of the bus restart circuit is such that when a signal is received on output 30 from the relay in under-voltage and phase failure sensor 28 representative of a variation of the electrical power beyond a prescribed value, a 1 will be supplied to AND gate A-1 which will also receive a 1 from the inverter I-1 connected to the most significant digit output of the outage timer such that the 1Hz clock pulses from 86 will be supplied to the outage timer. The signal from the under-voltage and phase failure sensor output 30 will also be supplied to reset the restart timer 88 and through OR gates O-6, O-7, O-8, O-9 and O-10 to the enable inputs of latches L-1, L-2, L-3, L-4 and L-5, respectively. The outage timer 84 determines the amount of time that the variation in the electrical power is beyond the prescribed value by counting the 1Hz clock pulses, and the output from the outage timer is compared with a predetermined time set in comparator 94 such that if the outage timer is less than the predetermined time, a 0 will be supplied to the AND gates in sequencer 90 and a 1 will be supplied to the AND gates in sequencer 92 via inverter I-3. Correspondingly, if the outage timer output is greater than or equal to the predetermined time, the comparator output will supply a 1 to the AND gates in sequencer 90 and a 0 to the AND gates in sequencer 92. If the power outage is of sufficient duration, the outage timer may continue to count until the output at the most significant digit of the counter chain is 1, and this 1 input to inverter I-1 is such that a 0 will be supplied to inhibit AND gate A-1 and interrupt the 1Hz clock input to the counter chain.

Upon return of normal power conditions, the undervoltage and phase failure sensor output 30 will be 0, and all inputs to AND gate A-2 will be 1 thereby permitting the 1Hz clock pulses to pass to the restart timer 88. As the restart timer counts the clock pulses, the restart relays R-20, R-30, R-40, R-50 and R-60 are sequentially energized to sequentially energize the bus loads in groups 74, 76, 78, 80 and 82, the time duration between the energization of successive restart relays being determined by the outage time as compared with the predetermined time in comparator 94. That is, if the output of comparator 94 is a 1 indicating a long outage time, the bus restart relays will be energized over an extended period of time whereas if the outage was short thereby placing a 0 on the output of comparator 94, the bus restart relays will be energized in rapid succession. To this end, the gates in sequencer 90 are connected with the restart timer so as to have large count differences required for enabling thereof whereas the gates in sequencer 92 are connected with the restart timer to have small count differences for enabling thereof. It will be appreciated, of course, that the AND gates in groups 90 and 92 can be connected in any manner with the restart timer to provide any desired sequence timing pattern and that any number of sequencer groups can be provided along with additional preset times in the comparator to provide a plurality of sequencing restart operations. When either AND gate A-3 or AND gate A-8 is enabled, OR gate O-1 will supply a 1 to the data input of latch L-1 and AND gate A-13; and, similarly, the remaining AND gates in the sequencers 90 and 92 are connected to provide 1's at the inputs to latches L-2, L-3, L-4 and L-5. With a 1 supplied to latch L-1, AND gate A-13 will provide a 1 through OR gate O-6 to the latch enable input when the least significant digit of the restart timer 88 goes to 0 while the data input to the latch remains at 1, and the output of the latch will remain at 1 to supply current to bus restart relay R-20 through buffer B-1 to permit energization of the loads in group 74. The bus restart relays R-30, R-40, R-50 and R-60 operate in a similar fashion to control load groups 76, 78, 80 and 82, respectively, with the time between energization of successive relays being determined by the outage time. The outage timer 84 will not be reset until the last bus restart relay R-60 is energized; and, thus, should power again be interrupted before the entire sequencing operation is completed, the outage timer will add this time to the previous outage time.

Figure 4:
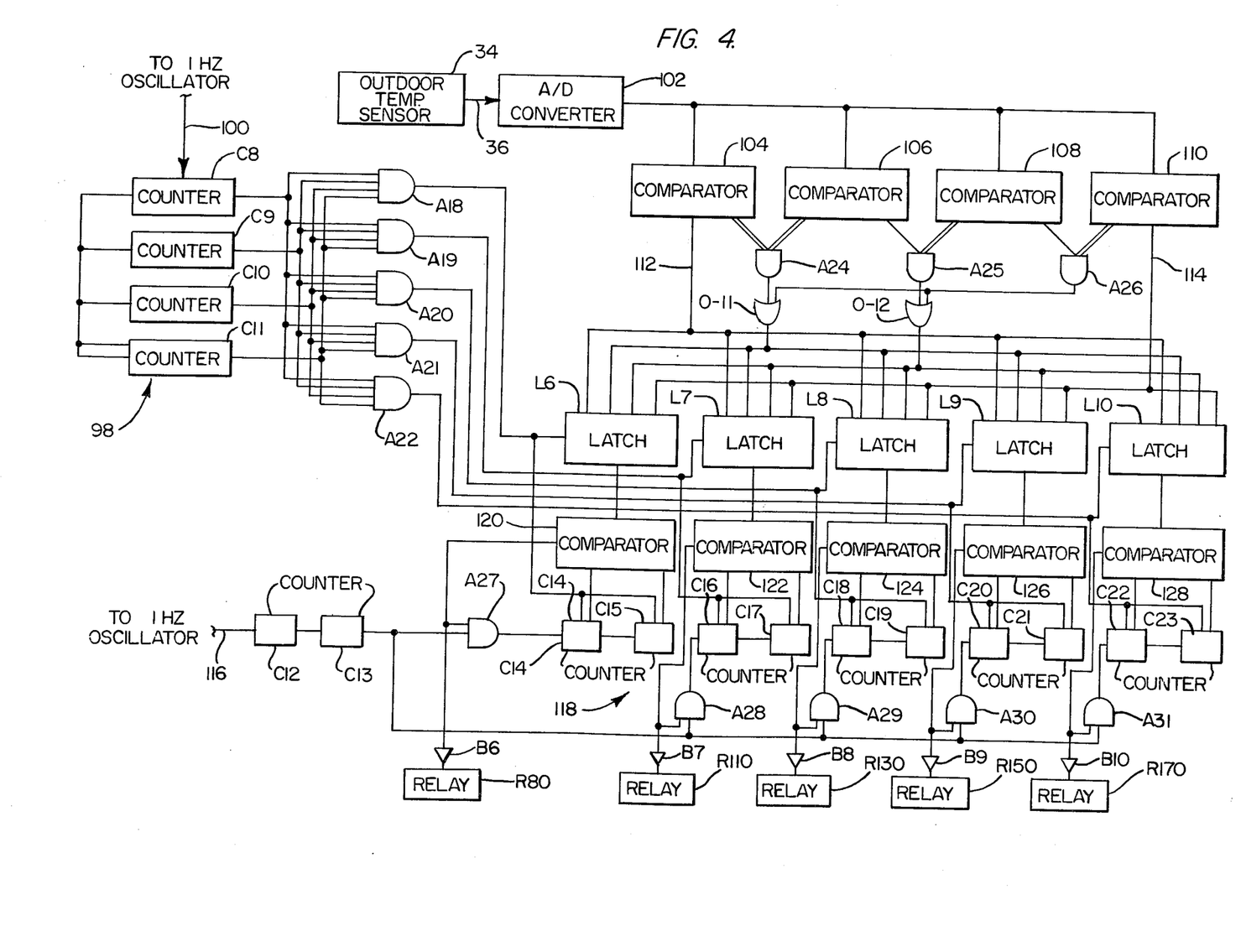
FIG. 4 is a schematic diagram of the group start-up circuit of the remote control system of the present invention.

The group start-up circuit is shown in FIG. 4 and includes a counter chain formed of counters C-8, C-9, C-10 and C-11 to define a cycle start timer 98, the counter chain receiving a clock input from the 1Hz oscillator on a lead 100. The outputs of the counters are supplied to AND gates A-18, A-19, A-20, A-21 and A-22 in a predetermined pattern to control cyclically the start times of the sequentially energized loads. The outdoor temperature sensor 34 provides an analog signal on output 36 to analog-to-digital converter 102 which supplies a digital signal corresponding to the outdoor temperature sensed to comparators 104, 106, 108 and 110. Comparator 104 produces a 1 output at 112 to the data input of latches L-6, L-7, L-8, L-9 and L-10 when zero percent cycling is required. Comparators 104 and 106 supply outputs to an AND gate A-24 which has its output connected through an OR gate O-11 to each data input of the latches L-6, L-7, L-8, L-9 and L-10, and the comparators 106 and 108 similarly have their outputs supplied to an AND gate A-25 which is connected via an OR gate O-12 with the data inputs of latches L-6, L-7, L-8, L-9 and L-10. An AND gate A-26 receives the outputs from comparators 108 and 110 and is connected with the data inputs of latches L-6, L-7, L-8, L-9 and L-10 through OR gates O-11 and O-12. The comparator 110 has an output 114 representative of 100 percent cycling connected directly with the data inputs of latches L-6, L-7, L-8, L-9 and L-10. The 1Hz oscillator pulses are also supplied via a lead 116 and counters C-12 and C-13 to be supplied to a cycle run timer chain 118 formed of counters C-14 and C-15, C-16 and C-17, C-18 and C-19, C-20 and C-21, and C-22 and C-23. The outputs from the latches L-6, L-7, L-8, L-9 and L-10 are compared with the outputs from the various counters of cycle run timer chain 118 in comparators 120, 122, 124, 126 and 128, respectively, and the outputs from the comparators 120, 122, 124, 126, and 128, respectively, drive group start-up relays R-80, R-110, R-130, R-150 and R-170 through buffers B-6, B-7, B-8, B-9 and B-10. The output from counter C-13 is supplied to AND gates A-27, A-28, A-29, A-30 and A-31 which also receive as second inputs the outputs of comparators 120, 122, 124, 126 and 128, respectively.

In operation, the group start-up circuit is responsive to the outdoor temperature sensed by sensor 34 to control the duty cycling of the loads at 25 percent increments, that is 0%, 25%, 50%, 75% or 100%. The comparators 104, 106, 108 and 110 have present inputs supplied thereto such that if the digital output of A/D converter 102 is greater than the preset input of comparator 104, the output on lead 112 will be a 1. This would correspond to a high outdoor temperature and the cycle will run 0% of the time. If the output of the A/D converter is less than or equal to the preset input of comparator 104 and more than or equal to preset input of comparator 106, AND gate A-24 will be 1 to provide a 25% duty cycle. In similar fashion, comparators 108 and 110 have preset inputs cooperating such that when AND gate A-25 is enabled, the cycle will run 50% of the time, when AND gate A-26 is enabled, the cycle will run 75% of the time and when there is a 1 on output 114, the cycle will run 100% of the time. The cycle start times are determined by AND gates A-18, A-19, A-20, A-21 and A-22 which are connected such as to be enabled at equal time spacings. When all of the inputs to AND gate A-18 are 1 indicating the proper cycle start time, latch L-6 will be enabled and counters C-14 and C-15 will be 0 reset. The comparators 120, 122, 124, 126 and 128 control the operation of relays R-80, R-110, R-130, R-150 and R-170 in such a manner that the relays are energized when the data from the latches is greater than the data from the corresponding counters and the relays are deenergized when the data from the latches is less than or equal to the data from the counters.

Assuming a binary minute to be equal to 64 seconds and a binary hour to be equal to 64 binary minutes, the output from counter C-13 will supply a 1 pulse every binary minute; and, if the output of OR gate O-11 corresponds to $2^4$ binary minutes or 0.25 binary hours, when AND gate A-24 supplies a 1 and AND gate A-19 supplies a 1, a $1 \times 2^4$ will be stored in latch L-7. This data will be compared with $0 \times 2^4 + 0 \times 2^5 + 0 \times 2^6$ output from counters C-16 and C-17; and, since the value of the data in latch L-7 is greater than that of the counters C-16 and C-17, the counter will receive one pulse per binary minute via AND gate A-28 and group start-up relay R-110 will be energized until the counters C-16 and C-17 count up to $1 \times 2^4$. At this time, the output from the comparator 122 will go to 0 to inhibit the AND gate A-28 and deenergize the group start-up relay R-110. If the output from AND gate A-25 was 1 when latch L-7 was latched, then the cycle would have run 32 binary minutes, the run start cycles being started at 64/5 binary minute intervals and the cycle start counter chain being 0 reset when $2^6$ binary minutes output goes to 1. The remaining group start-up relays R-130, R-150 and R-170 are operated in a manner similar to that described above relative to group start-up relays R-80 and R-110; and, thus, operation thereof is not described in detail.

An input circuit for the room count circuit 40 is shown in FIG. 5a, it being appreciated that an input circuit similar to that shown will be provided for each load. The input circuit includes contacts K-71, a resistor R and a capacitor C with the junction between the resistor and capacitor connected to an inverter I-14. Whenever a load relay is energized, its associated contacts (K-71 for R-70) in the corresponding input circuit will be closed to provide a 0 or low input to the inverter and, thus, produce a 1 output from the inverter, essentially indicating occupation of a room. The nature of the inverter is such that when the contacts K-71 are open, the capacitor will be charged to produce a 1 input to the inverter and, thus, provide a 0 output.

The room count circuit is shown in FIG. 5 and includes level-1, 2-bit full adders 130–161 each connected to receive an input from an inverter I-14 of FIG. 5a corresponding to energization of a load representative of room occupation, and the 2-bit adders 130–161 at level-1 supply outputs in successive pairs to level-2, 2-bit full adders 162—177 which also receive one input from an inverter I-14. Successive pairs of the second level full adders are connected with level-3, 4-bit full adders 178–185 which also receive one input from an inverter I-14, and the adders of level-3 are connected in successive pairs to level-4, 6-bit full adders 186–189 which also receive one input from an inverter I-14. Level-5 includes 8-bit full adders 190 and 191 receiving inputs from one of the inverters I-14 and from successive pairs of the level-4 adders and the level-5 adders supply outputs to an 8-bit full adder 192 along with one of the inverters I-14. The adders thus form a room count adder chain having an output 194 from adder 192 representative of the number of loads energized and therefore the number of rooms occupied. Of course, any desired counting scheme could be used to produce an output representative of the number of loads energized.

The output 194 from adder 192 is supplied to the excess manual switching circuit shown in FIG. 6. The output 194 is supplied to display 64 through decoder driver 196 in order to provide a visual display at the console of the actual number of energized remote control relays. The output 194 is also supplied to a 128-bit memory 198 and an 8-bit comparator 200. The data in the memory 198 is stored in sixteen, 8-bit words and stepped one position every 64 binary seconds and just prior to stepping to the next position a write enable input 202 to the memory is held at 0 by a NAND gate N-1 such that the data from adder 192 can be stored therein. The memory receives stepping inputs from counters C-24, C-25 and C-26 which count pulses from a 1Hz oscillator 204. The output of counters C-24 and C-25 are supplied to the write input of memory 198 via NAND gate N-1 while counters C-25 and C-26 have outputs supplied directly to the memory 198 to select memory location. The output of the memory 198 is inverted by an inverter I-5 and supplied to an 8-bit adder 206 which supplies an output to the comparator 200. The output from the comparator 200 is supplied along with 1Hz pulses and the output from a 3-line to 8-line decoder 208 to an AND gate A-32 which supplies its output to a counter C-27. The output from comparator 200 is also connected to the reset input of counter C-21 through an inverter I-6 and connected through an inverter I-7 to provide one input of OR gates O-13, O-14, O-15, O-16 and O-17. The counter C-27 has a least significant digit output supplied through an inverter I-8 to AND gates A-33, A-34, A-35, A-36 and A-37, and the decoder 208 has outputs supplied through inverters I-9, I-10, I-11, I-12 and I-13 to AND gates A-33, A-34, A-35, A-36 and A-37 and the data inputs to latches L-11, L-12, L-13, L-14 and L-15, respectively. The outputs of latches L-11, L-12, L-13, L-14 and L-15 are supplied through buffers B-11, B-12, B-13, B-14 and B-15 to excess manual switch relays R-90, R-120, R-140, R-160 and R-180 which control corresponding contacts K-90, K-120, K-140, K-160 and K-180, respectively, in the bus control circuit.

In operation, the 8-bits of memory from memory 198 are inverted due to the nature of the memory and added to a preset amount set in adder 206, and the output from adder 206 is compared to the output from adder 192 in comparator 200. The memory 198 is stepped once per binary minute such that the output of the memory at any time corresponds to the input of the memory sixteen minutes prior. If the output from adder 192 equals or exceeds the output from adder 206, the output of comparator 114 will be a 0 thereby inhibiting the 1Hz pulsing of counter C-27, causing the counter C-27 to be 0 reset through inverter I-6 and causing the latches L-11, L-12, L-13, L-14 and L-15 to be 0 reset through inverter I-7 and OR gates O-13, O-14, O-15, O-16 and O-17. Accordingly, excess manual switching relays R-90, R-120, R-140, R-160 and R-180 will be deenergized to open the corresponding excess manual contacts in the bus control circuit and thereby prevent the adding of additional loads. Memory 198 has sixteen memory addresses, and the output of the oldest stored data is continuously compared to the output of adder 192. In this manner, when the output of adder 206 again exceeds the output of adder 192, the output of comparator 200 will be a 1 and AND gate A-32 will be enabled to pass the 1Hz pulses to counter C-27 until the eighth line goes to 0 at which time the AND gate A-32 will be inhibited through decoder 208. The least significant digit output ($2^0$ count) of counter C-27 is inverted and supplied to AND gates A-33, A-34, A-35, A-36 and A-37 while the three most significant digit outputs of counter C-27 are supplied to decoder 208. When a line is decoded from counter C-27, for example on the output to inverter I-9, the output of inverter I-9 will be 1. When the least significant digit goes to 0 and, consequently, the output of inverter I-8 goes to 1, latch L-11 will be enabled, and the data input to the latch will be 1 to close excess manual switching relay R-90. If the added load should exceed the amount allowed by the input to comparator 200 from adder 206, then the excess manual switching relays R-90, R-120, R-40, R-160 and R-180 that had been energized will be deenergized.

The operation of the remote control system of the present invention as a whole will now be described without reference to the specific operation of each of the circuits set forth above. During normal operation, the relay in the under-voltage and phase failure sensor 28 is closed with the AC power input within the normal operating conditions and the bus restart contacts K-20, K-30, K-40, K-50 and K-60 are closed due to the restart timer having counted out with a 0 on the under-voltage and phase failure sensor output 30. The desired remote controlled loads are energized in accordance with those switches S-1, S-2 . . . which have been manually actuated by an operator at the central station with current through the load relays being maintained via their associated holding contacts.

Should the sensor 28 sense a variation in the supplied electrical power, such as under-voltage or phase failure, for a small period of time sufficient to permit normal line transients of short duration to be disregarded, the relay will drop out and contacts K-10 will open to deenergize the loads. Accordingly, protection is afforded to motorized loads if one or more of the phase voltages varies from the prescribed limit for a period exceeding the time delay period provided for transients. Additionally, the period of time that power is not supplied to the loads is determined by outage timer 84 such that, once power is resumed, the loads can be sequentially reenergized via bus restart relays R-20, R-30, R-40, R-50 and R-60 with the timing between successive energization of the relays being determined in accordance with the outage time. The outage timer 84 measures the total length of time during which no load was on the line from the first power outage until all loads have been reenergized due to the fact that the outage timer is not 0 reset until the last bus restart relay R-60 is energized. For example, if an outage occurs at time A and continues to time B and the bus restart sequence control commences restoring the loads to the line but does not complete the procedure of restoring full load prior to another outage at time C which continues to time D, the outage timer will add the time between the times A and B to the time between times C and D. The time determined by outage timer 84 determines which procedure will be followed for restoring the loads to full operation which is extremely inportant in the operation of air-conditioning equipment. If the time outage is less than the predetermined period of time set in comparator 94, the load buses will be returned to service in rapid succession with the delay imposed between sequential energization being such that the starting current for all units on line will not appear simultaneously. If the time outage has been off for more than the predetermined period of time, it is likely, especially during periods of peak demand, that a significant number of units, more than the average number of units which would be calling for heating or cooling due to normal cycling, would appear on the line thereby creating a maximum demand condition. Accordingly, a delayed restarting procedure is used which allws sufficient time for the first level of load to begin its normal cycling process before a second level of loads would be applied and in a similar manner, the third, fourth and fifth load levels are controlled. Therefore, peak demand for the installation is normally limited to the average number of units cycling on the first four buses in addition to the full load which might be applied on the fifth bus.

The room count circuit limits the operator at the central control console from manually adding an excessive amount of load to the line within a specified period of time in that the room count circuit provides a binary output indicative of the number of loads (remote control devices) energized for storage in memory. is continuously updated, and every minute the instantaneous output is stored in another register of a memory which will store sixteen readings. After each recording of the output, the memory is stepped to the next position which was recorded sixteen minutes previous to that time, and this output plus a signal from the adder 206 representative of a maximum preset number of loads allowed to be additionally energized in the predetermined period of time is continuously compared to the current reading. If the new current reading exceeds the reading of sixteen minutes prior by a predetermined amount determined by adder 206, the excess manual switching circuit will prevent further manual starting until the previously applied load has commenced cycling.

The group start-up circuit provides temperature control operation for the units to prevent indoor temperature of individual units from dropping below a predetermined level below which freeze damage might occur. The operation of the group start-up circuit is dependent upon the mechanical design considerations of the units. The percentage of time or duty cycle that all of the units on each bus are energized in inversely related to the outdoor temperature; and, where five bus levels are used as disclosed above, they are cycled at equal intervals. By modifying the output of the analog-to-digital converter of the group start-up circuit to be inversely proportional to the outdoor temperature, the group start-up circuit can provide room temperature maintenance control; or, if desired, two substantially identical group start-up circuits could be used to provide freeze protection and room temperature maintenance simultaneously.

The circuits of the remote control system of the present invention could be implemented in any suitable logical manner; however, the above described logic arrangements are preferred. Similarly, the remote control system of the present invention can use AC or DC power for relay control and the remote control devices can be loads of any nature suitable to control ultimate remotely controlled loads.

Inasmuch as the present invention is subject to many variations, modifications and changes in detail, it is intended that all subject matter described above or shown in the accompanying drawings be interpreted as illustrative and not in a limiting sense.

What is claimed is:

1. A remote control system for a plurality of loads adapted to be operated by electrical power supplied on a plurality of buses comprising:
   switching means for controlling the electrical power supplied to the loads;
   electrical sensing means for providing a signal corresponding to variations of the electrical power from a prescribed value;
   restarting means receiving said signal from said electrical sensing means and including timing means for producing a timing signal representative of the time said signal from said electrical sensing means exists, a plurality of output means coupled with said switching means and responsive to said signal from said electrical sensing means for interrupting power supplied to the loads, and sequencing means responsive to said timing means to sequentially operate said output means with the time between the operation of successive output means dependent upon the time said signal from said electrical sensing means exists whereby power is returned to the loads sequentially.

2. A remote control system as recited in claim 1 wherein said restarting means includes comparator means for comparing said timing signal with a preset, time-representative signal and providing a compare output, and said sequencing means includes sequencer means responsive to said compare output to operate said output means at a first sequential rate when said timing signal is less than said preset, time-representative signal and at a second rate slower than said first rate when said timing signal is greater than said preset, time-representative signal.

3. A remote control system as recited in claim 2 wherein said sequencing means includes restart counter means, and said sequencer means includes first and second groups of gates enabled by said restart counter means and said comparator means.

4. A remote control system as recited in claim 3 wherein said switching means includes a plurality of contacts for controlling the loads and said output means of said restarting means includes a plurality of relays operated by said first and second groups of gates for controlling said plurality of contacts.

5. A remote control system as recited in claim 1 and further comprising means for sensing outdoor temperature and providing an electrical signal representative thereof, comparator means for comparing said signal from said temperature sensing means with predetermined levels to provide a plurality of cycling signals, and means responsive to said cycling signals to cyclically operate said switching means whereby said loads are time cycled in accordance with the outdoor temperature.

6. A remote control system as recited in claim 5 and further comprising means for manually actuating said switching means to energize said switching means to energize said loads, counter means for counting the number of loads presently energized and providing a first signal corresponding thereto, memory means having an input receiving said first signal from said counter means for storing said first signal and an output providing a second signal stored in said memory means for a predetermined period of time and representative of the number of loads energized at a prior time, adder means receiving said second signal from said output of said memory means for adding a signal thereto representative of a maximum preset number of loads allowed to be additionally energized in said predetermined period of time to produce a third signal representative of the number of loads energized at the prior time plus the preset number of loads allowed to be additionally energized in said predetermined period of time, comparator means receiving said first signal from said counter means and said third signal from said adder means for comparing the number of loads presently energized with the number of loads energized at the prior time plus the preset number of loads allowed to be additionally energized in said predetermined period of time, and means responsive to said comparator means to prevent energization of a manually actuated load when the number of loads presently energized exceeds said number of loads energized at said prior time plus the preset number of loads allowed to be additionally energized in said predetermined period of time.

7. A remote control system as recited in claim 1 and further comprising means for manually actuating said switching means to energize said switching means to energize said loads, counter means for counting the number of loads presently energized and providing a first signal corresponding thereto, memory means having an input receiving said first signal from said counter means for storing said first signal and an output providing a second signal stored in said memory means for a predetermined period of time and representative of the number of loads energized at a prior time, adder means receiving said second signal from said output of said memory means for adding a signal thereto representative of a maximum preset number of loads allowed to be additionally energized in said predetermined period of time to produce a third signal representative of the number of loads energized at the prior time plus the preset number of loads allowed to be additionally energized in said predetermined period of time, comparator means receiving said first signal from said counter means and said third signal from said adder means for comparing the number of loads presently energized wtih the number of loads energized at the prior time plus the preset number of loads allowed to be additionally energized in said predetermined period of time, and means responsive to said comparator means to prevent energization of a manually actuated load when the number of loads presently energized exceeds said number of loads energized at said prior time plus the preset number of loads allowed to be additionally energized in said predetermined period of time.

8. A remote control system for electrically operated loads comprising:
   switching means for controlling a plurality of loads;
   means for sensing outdoor temperature and providing an electrical signal representative thereof;

comparator means for comparing said signal from said temperature sensing means with predetermined levels to provide a plurality of cycling signals; and means responsive to said cycling signals to cyclically operate said switching means whereby said loads are time cycled in accordance with the outdoor temperature.

9. A remote control system as recited in claim 8 wherein said cyclically operating means includes latch means for storing said cycling signals, counter means for counting clock pulses, second comparator means coupled with said counter means and said latch means for comparing the count in said counter means with said cycling signals and a plurality of relay means operable by said second comparator means at predetermined intervals.

10. A remote control system as recited in claim 9 and further comprising means for manually actuating said switching means to energize said loads, counter means for counting the number of loads presently energized and providing a first signal corresponding thereto, memory means having an input receiving said first signal from said counter means for storing said first signal and an output providing a second signal stored in said memory means for a predetermined period of time and representative of the number of loads energized at a prior time, adder means receiving said second signal from said output of said memory means for adding a signal thereto representative of a maximum preset number of loads allowed to be additionally energized in said predetermined period of time to produce a third signal representative of the number of loads energized at the prior time plus the preset number of loads allowed to be additionally energized in said predetermined period of time, comparator means receiving said first signal from said counter means and said third signal from said adder means for comparing the number of loads presently energized with the number of loads energized ath the prior time plus the preset number of loads allowed to be additionally energized in said predetermined period of time, and means responsive to said comparator means to prevent energization of a manually actuated load when the number of loads presently energized exceeds said number of loads energized at said prior time plus the preset number of loads allowed to be additionally energized in said predetermined period of time.

11. A remote control system for electrically operated loads comprising:
switching means for controlling a plurality of loads;
means for manually actuating said switching means to energize said switching means to energize said loads;
counter means for counting the number of loads presently energized and providing a first signal corresponding thereto;
memory means having an input receiving said first signal from said counter means for storing said first signal and an output providing a second signal stored in said memory means for a predetermined period of time and representative of the number of loads energized at a prior time;
adder means receiving said second signal from said output of said memory means for adding a signal thereto representative of a maximum preset number of loads allowed to be additionally energized in said predetermined period of time to produce a third signal representative of the number of loads energized at the prior time plus the preset number of loads allowed to be additionally energized in said predetermined period of time;
comparator means receiving said first signal from said counter means and said third signal from said adder means for comparing the number of loads presently energized with the number of loads energized at the prior time plus the preset number of loads allowed to be additionally energized in said predetermined period of time; and
means responsive to said comparator means to prevent energization of a manually actuated load when the number of loads presently energized exceeds said number of loads energized at said prior time plus the preset number of loads allowed to be additionally energized in said predetermined period of time.

12. A remote control system as recited in claim 11 and further comprising a plurality of output means responsive to said comparator means for sequentially controlling the loads when the number of loads presently energized drops below the number of loads energized at the prior time plus the preset number of loads allowed to be energized in said predetermined period of time.

13. A remote control system as recited in claim 12 and further comprising counting means receiving clock pulses under the control of said comparator means to sequentially operate said output means.

14. A remote control system for electrically operated loads comprising:
manually responsive means for selectively controlling the energization of a plurality of loads;
means for determining the number of loads energized at a point in time;
means, connected to said means for determining, for comparing the number of loads energized at a point in time with a predetermined maximum; and
means, responsive to said means for comparing, for preventing energization of additional loads by said manually responsive means until the number of loads energized is less than the predetermined maximum number of loads.

15. A remote control system as recited in claim 14 wherein said means for comparing comprises:
memory means for receiving signals representative of the number of loads energized at points in time;
adder means for adding a signal representative of a preset maximum number of loads allowed to be energized to signals received from said memory means; and
comparator means for comparing a signal representative of the number of loads presently energized with signals from said adder representative of the number of loads energized at a prior predetermined point in time and the preset maximum number of loads allowed to be energized.

16. A remote control system as recited in claim 14 and further comprising:
display means responsive to said means for determining for indicating the number of loads energized at any point in time.

17. A method for remotely controlling electrically operated loads to reduce peak energy consumption comprising the steps of:
energizing a plurality of loads by manual selection;

determining the number of loads energized at sequential points in time;

comparing the number of loads energized at sequential points in time with a predetermined maximum number of loads which can be energized at any point in time; and controlling the capacity to manually energize additional loads in the event said step of comparison indicates that the number of loads energized at a point in time is equal to or exceeds the predetermined maximum.

18. A method for remotely controlling electrically operated loads as defined in claim 1 wherein said step of comparing comprises the steps of:

storing signals representative of the number of loads energized at points in time;

sequentially adding to the stored signals a signal representative of a preset maximum number of loads allowed to be energized; and comparing a signal representative of the number of loads presently energized with the sequentially added signals.

* * * * *